United States Patent Office 3,701,715
Patented Oct. 31, 1972

3,701,715
METHOD FOR THE PRODUCTION OF GLUCOSE OXIDASE
Krishnaiyer Lakshminarayanan, Harbor Beach, Mich., assignor to Dawe's Laboratories, Inc., Chicago Heights, Ill.
No Drawing. Filed Feb. 4, 1971, Ser. No. 112,806
Int. Cl. C12d *13/10*
U.S. Cl. 195—65      19 Claims

ABSTRACT OF THE DISCLOSURE

This invention is addressed to an improved method for the preparation of glucose oxidase in which glucose oxidase-producing strains of the genera Aspergillus and Penicillium are cultivated in medium having a low carbohydrate content in which the carbohydrate has a dextrose equivalent of 60–85, in the presence of hydrated magnesium sulfate, monopotassium phosphate, and a source of assimilable nitrogen in the form of a nitrate salt or an ammonium salt.

---

This invention relates to the production of glucose oxidase by fermentation processes, and more particularly it relates to the production of large quantities of glucose oxidase in a short fermentation time from dilute, economical media.

Glucose oxidase is the enzyme which catalyzes the oxidation of glucose to gluconic acid. Glucose oxidase was first isolated from cells of *Aspergillus niger* by Müller [Biochemische Zeitschrift, 199, 136–170 (1928) and 232, 423–424 (1931)]. The enzyme was also extracted from *Aspergillus niger* by Franke and Deffner [Annalen der Chemie, 541 117–150 (1939)]. The production of glucose oxidase by Penicillium species was reported by Müller [Ergebnisse der Enzymforschung, 5, 259–272 (1936)] and by Coulthard et al., [Biochemical Journal, 39, 24–36 (1945)]. Baker, in U.S. Pat. No. 2,482,724, described the production of glucose oxidase from cells of species of *Penicillium chrysogenum, Penicillium glaucum, Penicillium purpurogenum, Aspergillus niger* and *Aspergillus fumaricus*.

Glucose oxidase is currently in use for desugaring eggs, for the removal of oxygen from beverages, moist food products, flavors, and hermetically sealed food packages, and for the detection and estimation of glucose in industrial solutions and in body fluids such as blood and urine. References to these uses can be found in Chapter 9 (pages 210–211) of the book Microbial Technology edited by Henry J. Peppler, published in 1967 by Reinhold Publishing Corp., New York.

Heretofore most of the commercially produced glucose oxidase has been isolated from mycelium of *Aspergillus niger* grown principally for the production of gluconic acid or its salts, such as sodium gluconate or calcium gluconate. Accordingly, the enzyme has been obtained essentially as a by-product or co-product of gluconate production. Current markets for glucose oxidase frequently demand more of this enzyme than can be conveniently and economically obtained from fermentations conducted principally for gluconate production.

The sodium gluconate fermentation process described by Blom et al., [Industrial and Engineering Chemistry, 44, 435–440 (1952)] utilizing *Aspergillus niger* as the fermenting organism, is representative of present commercial gluconate fermentations. The Blom method uses initial glucose concentrations of 24 to 38%, and fermentation periods of 30 to 40 hours, with pH controlled at 6 to 7. Blom et al. did not report on the glucose oxidase formed during the course of their fermentation, but tests which have been made show that such fermentations yield about 2.5 to 4.5 grams of mycelium (dry basis) per liter of fermentation broth, and that such mycelium usually contains about 2000 to 3500 glucose oxidase units.

The glucose oxidase unit is well understood by those skilled in the art and is defined as "that quantity of enzyme which will cause the uptake of 10 mm.$^3$ of oxygen per minute in the Warburg manometer at 30° C. in the presence of excess oxygen with a substrate containing 3.3% of glucose monohydrate and 0.1 M phosphate buffer, pH 5.9." Glucose oxidase may be conveniently assayed by the titrimetric method described by Underkofler [Society of Chemical Industry (London), Monograph 11, page 72 (1961)].

It would be desirable and advantageous if good yields of glucose oxidase could be obtained by a modified Blom et al. procedure, for example, by a procedure in which *A. niger* mycelium would be grown during a short fermentation time on a medium containing low initial levels of glucose. Such a procedure would provide important economies in time and materials. Unfortunately, when *A. niger* is grown on dilute glucose solutions under the conditions described by Blom et al., the glucose is rapidly consumed and only small amounts of mycelium and glucose oxidase are formed.

It is accordingly an object of the present invention to provide an improved method for cultivating glucose oxidase-producing fungi of the genus Aspergillus or the genus Penicillium in which use is made of small quantities or low concentrations of raw materials and unusually brief fermentation periods to produce high yields of glucose oxidase.

The concepts of the present invention reside in an improved process for the preparation of glucose oxidase in which glucose oxidase-producing strains of the genera Aspergillus or Penicillium are cultivated in a medium having a relatively low concentration of carbohydrate source and in the presence of a source of assimilable nitrogen, a hydrated magnesium sulfate, monopotassium phosphate and optionally a member of the Krebs citric acid cycle.

In contrast to the conventional gluconate fermentation in which glucose in high concentrations is the preferred sole carbohydrate, the method of my invention utilizes low concentrations of carbohydrate formed of products of starch hydrolysis, such that the dextrose equivalent (DE) of the carbohydrate component of the medium is within the range of 60 to 85, and preferably 65 to 80. Dextrose equivalent (DE) is defined as $$DE = \frac{\text{Reducing sugar (expressed as dextrose)}}{\text{Total carbohydrate}} \times 100$$

As used herein, the terms "glucose" and "dextrose" are used interchangeably. Crystalline glucose has a DE of essentially 100; raw starch has a DE of essentially zero; and dextrins and corn sirups have intermediate DE values.

In the process of my invention, if the total carbohydrate component of the medium has a DE of 60 to 85 there is sufficient readily metabolizeable sugar, principally glucose, to support rapid growth of the glucose oxidase-producing fungi, plus a reserve of slowly metabolized carbohydrate to maintain the fungal cells in an active state with respect to the formation of glucose oxidase. If the total carbohydrate component has a DE less than about 60 there is not sufficient readily metabolizeable sugar to permit rapid growth of the fungal cells. If the total carbohydrate component has a DE higher than about 85 rapid growth of a limited quantity of fungal cells may occur, but the cells are maintained in an enzyme-productive state for only a brief time, with the result that relatively little glucose oxidase is formed.

Carbohydrates suitable for use in the process of my invention are starches, and dextrins and sugars prepared by acid or enzyme hydrolysis of starch, and mixtures of such substances. Starches from a wide variety of sources may be used including, for example, starches from corn, wheat, rice, potato, sweet potato, tapioca and the like, as initial sources of starch and starch hydrolysis products.

The total carbohydrate concentration in the nutrient medium employed in the process of my invention should be within the range of 1.0 to 3.5%, and preferably within the range of 1.5 to 2.5%. The following compositions are illustrative of appropriate carbohydrate components of nutrient media used in my process, although the listing of these compositions is in no way limiting or restrictive:

(a) A 2% solution of corn sirup solids having a DE of 75;
(b) A medium containing 1.64% glucose monohydrate (8.5% moisture, DE 100), plus 0.8% dextrin of DE 15, resulting in a DE of about 71 for the mixture, and a total carbohydrate concentration of about 2.3% (dry basis);
(c) A medium containing 2.0% glucose monohydrate plus 0.6% wheat starch, resulting in a DE of about 76 for the mixture, and a total carbohydrate concentration of about 2.43% (dry basis);
(d) A mixture of 1.5% (solids basis) of hydrolyzed starch of 85 DE with 0.5% of dextrin of DE 20, resulting in a total of 2.0% solids with DE about 69.

Although corn steep water often contains small amounts of carbohydrates, the steep water is a minor component of the nutrient medium and therefore the carbohydrate contributed by it is ignored in computing the carbohydrate balance of the medium. It is generally preferred to use about 0.2% corn steep water in the nutrient medium, although this level is not critical and concentrations from 0.1% to 0.4% may be employed.. Corn steep water contains about 50 to 54% solids; the indicated use levels are on the wet basis.

In the process of my invention, it is desirable to include a hydrated magnesium sulfate, such as magnesium sulfate heptahydrate and monopotassium phosphate in the nutrient medium, each at levels within the range of 0.003% to 0.01%, and preferably at about 0.006%. The preferred concentration is substantially less than the 0.02% level of each of these salts specified by Blom et al. for gluconate production. It has been found that the indicated lower concentrations of these essential salts are favorable for the production of a limited, but adequate quantity of fungal mycelium having a high glucose oxidase content, whereas the provision of larger amounts of magnesium sulfate and potassium phosphate causes the formation of large quantities of mycelium having low enzyme content. In enzyme recovery operations, it is advantageous to process the smaller quantity of enzyme-rich fungal cells.

As sources of assimilable nitrogen in the nutrient medium a variety of compounds may be employed, such as nitrate salts and ammonium salts. Sodium nitrate, potassium nitrate, ammonium sulfate, or ammonium nitrate may be used at concentrations between 0.1 and 0.3%. Ammonium nitrate at a concentration of about 0.2% is preferred as it appears to give high glucose oxidase yields more consistently than other nitrogen sources. Urea, which is used as a nitrogen source by Blom et al., appears to be especially unfavorable in glucose oxidase production.

As indicated above, the fermentation metal is preferably, but not necessarily, formulated to include an acid component. For this purpose, use should be made of one or more of the acids of the Krebs or citric acid cycle. Such acids include succinic acid, fumaric acid, α-ketoglutaric acid, oxaloacetic acid, isocitric acid, malic acid, cis-aconitic acid and citric acid. Succinic acid and citric acid are preferred. The amount of the acid employed is not critical and can be varied as high as 0.05%, although best results are usually obtained when the acid component constitutes about 0.02%. The acid component can be employed in the form of the free acid, or in the form of the corresponding sodium, potassium or ammonium salts.

The pH range within which glucose oxidase production proceeds best in the process of my invention is 4 to 6, and preferably 4.4 to 4.6. This range is different from the pH range 6 to 7 specified by Blom et al. for gluconate production. As is now common practice in fermentation technology, the pH of the fermenting mash is maintained at the desired level by the automatic addition of solutions of sodium hydroxide or other alkaline material.

In the process of my invention, the fermentation is terminated when consumption of the neutralizing agent (for example, caustic soda solution) ceases. Experience has shown that the reducing sugar concentration will usually be about 0.25% at this time, and that the fermentation periods are only about 9 to 12 hours, in contrast to 30 to 40 hours required for gluconate production by conventional methods, which require the oxidation of 24 to 38% glucose solutions. The economic and technical advantages of producing high yields of glucose oxidase from dilute nutrient media in a short fermentation period have already been mentioned and will be readily apparent to those skilled in the art.

Glucose oxidase produced by fungi is predominately intracellular and should be recovered from the cells by rupturing or autolyzing them. At the termination of the fermentation, the fungal cells are separated from the fermentation mash by suitable means such as filtration or centrifugation, and are then subjected to procedures for enzyme isolation and purification such as those described by Goldsmith et al. in the U.S. Pat. No. 2,926,122. The mash filtrate contains relatively small quantities of gluconate salts, plus residues from the fermentation medium. The concentrations are so low that it is usually uneconomical to recover the solids, and they may therefore be discarded. However, under some circumstances it may be desirable to concentrate the filtrates and use them as crude sequestering materials. The feasibility of discarding the weak filtrate is one of the advantages of my process over the conventional gluconate fermentation, in which the investment in time and raw materials is too great to permit the discharge of the filtrate to waste. Furthermore, the biological oxygen demand (BOD) of a concentrated fermentation broth or filtrate of such prior art processes is too great to permit its disposal as waste.

The quantity of glucose oxidase produced per unit volume of fermentation mash is of primary importance, but the glucose oxidase activity per unit dry weight of cells is also significant, since the cells should be subjected to further processing for the separation and refining of the enzyme. It has been convenient to refer to the activity of the mycelium as "specific activity," which is defined as the number of glucose oxidase units per gram (dry weight) of mycelium. Obviously, it is advantageous to process mycelium of high specific activity rather than mycelium of low specific activity.

A comparison of the nutrient medium and fermentation conditions used in the process of my invention for enzyme production with the medium and conditions used by Blom et al. for gluconate production is given in Table I. As previously stated, the factors shown by Blom et al. are typical of present fermentations conducted principally to produce gluconate.

TABLE I.—COMPARISON OF MEDIUM COMPOSITION AND FERMENTATION CONDITIONS FOR PRODUCTION OF GLUCONATE AND FOR GLUCOSE OXIDASE

|  | Gluconate production per Blom et al. | Glucose oxidase production by my process |
|---|---|---|
| Medium composition: |  |  |
| Carbohydrate content, percent | 24–38 | 1.5–2.5 |
| DE of carbohydrate component | ca. 100 | 65–80 |
| Corn steep water, percent | 0.37 | ca. 0.2 |
| Nitrogen sources, percent: |  |  |
| Urea | 0.01 | None |
| Diammonium phosphate | 0.04 | None |
| Ammonium nitrate | None | ca. 0.2 |
| Magnesium sulfate heptahydrate | 0.017 | ca. 0.006 |
| Monopotassium phosphate | 0.02 | ca. 0.006 |
| Citric acid or succinic acid | None | ca. 0.02 |
| Fermentation conditions: |  |  |
| pH during fermentation | 6–7 | 4–6 |
| Length of fermentation, hours | 30–40 | 9–12 |
| Aeration rate, v.v.m | 1.0–1.5 | 0.5–1.0 |
| Air pressure, p.s.i.g | 30 | 20 |
| Temperature, °C | 33–34 | 33–34 |
| Agitation | (¹) | (¹) |
| Glucose oxidase produced per liter of broth, units | 2,000–3,500 | 3,000–6,500 |
| Mycelium produced per liter, grams | 2.5–4.5 | 4–8 |
| Specific activity of mycelium | 700–1,000 | 800–1,500 |

¹ Vigorous.

All percentages herein are expressed in weight in grams per 100 ml. of volume.

Glucose oxidase-producing fungi of the genus Aspergillus and the genus Penicillium may be used as the fermenting organisms in the process of my invention.

The following examples illustrate how glucose oxidase production may be conducted according to the process of my invention, and also show some of the inadequate results obtained when methods other than my method are employed. However, the examples shown here are provided for purposes of illustration, and not of limitation of the practice of the invention.

EXAMPLE 1

A series of fermentations was conducted in a 700-liter jacketed, stirred, stainless steel fermentor equipped for automatic pH control, using nutrient medium of the following composition, and five different strains of *Aspergillus niger* obtained from the Culture Collection of the Northern Regional Research Laboratory, U.S. Department of Agriculture, Peoria, Ill.

| Volume of medium, liters | 500 |
|---|---|
| Commercial glucose monohydrate percent | 1.65 |
| Dextrin from corn starch (DE 15) do | 0.5 |
| Corn steep water (wet basis) do | 0.42 |
| Ammonium nitrate do | 0.21 |
| Magnesium sulfate heptahydrate do | 0.0055 |
| Monopotassium phosphate do | 0.0055 |
| Citric acid do | 0.022 |

The DE of the medium was approximately 79.

The medium was sterilized by means of steam in the jacket at 121° C. for 30 minutes. It was then cooled to 34° C. and inoculated with 50 liters of a 24-hour-old culture of one of the designated *Aspergillus niger* strains which had been grown on a medium containing 3.3% glucose monohydrate, 0.33% corn steep water, 0.033% ammonium sulfate, and traces of magnesium sulfate and potassium phosphate. From previous experience, this inoculum medium was known to produce potent vegetative fungus mycelium, suitable for use in inoculating fermentors.

In the five cited tests, the inoculated medium was aerated with 1 VVM of air at a head pressure of 20 p.s.i.g., and was stirred constantly with a turbine impeller at 220 r.p.m. The temperature was maintained at 34° C. and the pH was held at 4.5 by the automatic addition of 50% aqueous sodium hydroxide solution. The fermentations were terminated when caustic consumption ceased, and samples of the mash were then analyzed for mycelium content and glucose oxidase content of the mycelium, with the results being shown in the following table.

TABLE II

| Organism used | Fermentation time (hours) | Mycelium per liter, dry basis (grams) | Intracellular glucose oxidase (units/liter) | Specific activity of mycelium (units/gram) |
|---|---|---|---|---|
| *A. niger*: |  |  |  |  |
| NRRL 3 | 11 | 5.29 | 5,000 | 945 |
| NRRL 323 | 10 | 5.96 | 2,500 | 419 |
| NRRL 328 | 11.25 | 7.92 | 3,000 | 379 |
| NRRL 364 | 10 | 6.78 | 2–400 | 354 |
| KRRL 538 | 11 | 5.46 | 6,000 | 1,099 |

This example shows good production of mycelium and enzyme by several different strains of *Aspergillus niger* cultivated according to the method of my invention.

EXAMPLE 2

A fermentation was conducted in accordance with the procedure of Example 1 except that the 0.5% dextrin was replaced with 0.375% wheat starch. The DE of the medium was, therefore, approximately 80. The fermenting organism was *Aspergillus niger* NRRL 3. The fermentation was terminated at 11 hours, at which time the mycelium weight was 6.01 grams per liter, the intracellular glucose oxidase was 3900 units per liter, and the specific activity of the mycelium was 650 units per gram.

EXAMPLE 3

A fermentation nutrient medium of the following composition was prepared in the same equipment used in Example 1:

| | Percent |
|---|---|
| Enzyme-hydrolyzed corn dextrin, to DE 85, added on a solids basis to give | 1.65 |
| Dextrin from corn (DE 15) | 0.5 |
| Ammonium nitrate | 0.2 |
| Corn steep water (wet basis) | 0.4 |
| Magnesium sulfate heptahydrate | 0.0055 |
| Monopotassium phosphate | 0.0055 |
| Citric acid | 0.024 |

The DE of the medium was about 68.5. The fermenting organism was *Aspergillus niger* NRRL 3 and the operating conditions were the same as those described for Example 1. The fermentation was terminated after 10 hours, at which time the mycelium weight (dry basis) was 5.54 grams per liter, the intracellular glucose oxidase was 4000 units per liter, and the specific activity of the mycelium was 722 units per gram.

EXAMPLE 4

A fermentation nutrient medium of the following composition was prepared in the same equipment used in Example 1:

| | Percent |
|---|---|
| Commercial glucose monohydrate | 4.0 |
| Ammonium sulfate | 0.06 |
| Magnesium sulfate heptahydrate | 0.04 |
| Monopotassium phosphate | 0.04 |
| Urea | 0.027 |
| Dextrin | None |
| Starch | None |
| Citric acid | None |

The DE of this medium was approximately 100. The fermenting organism was *Aspergillus niger* NRRL 3, and the operating conditions were the same as in Example 1. The fermentation was terminated after 8.5 hours, at which time the mycelium weight (dry basis) was 1.37 grams per liter, the intracellular glucose oxidase was 1050 units per liter, and the specific activity of the mycelium was 766 units per gram. This example shows the poor yield of glucose oxidase obtained when the medium contains glucose as the sole carbohydrate, when ammonium sulfate and urea are used as nitrogen sources, and when the concentrations of magnesium sulfate and potassium phosphate are higher than optimum.

EXAMPLE 5

A fermentation medium of the following composition was prepared in the same equipment used for Example 1:

| | Percent |
|---|---|
| Commercial glucose monohydrate | 6.0 |
| Corn steep water (wet basis) | 0.8 |
| Ammonium sulfate | 0.03 |
| Magnesium sulfate heptahydrate | 0.025 |
| Monopotassium phosphate | 0.025 |
| Urea | 0.2 |

The DE of this medium was approximately 100. The fermenting organism was *Aspergillus niger* NRRL 3, and the operating conditions were the same as in Example 1. The fermentation was terminated after 9 hours, at which time the mycelium weight (dry basis) was only 3.1 grams per liter, the intracellular glucose oxidase was 1900 units per liter, and the specific activity of the mycelium was 610 units per gram. This experiment also shows the inferior yield of enzyme obtained when adverse conditions are used, such as relatively high concentration of glucose as the sole carbohydrate, high concentrations of magnesium sulfate and potassium phosphate, and the use of urea as the principal nitrogen source.

It will be understood that various changes and modifications can be made in the details of procedure, formulation and use without departing from the spirit of the invention, especially as defined in the following claims.

I claim:

1. A method for the preparation of glucose oxidase comprising cultivating glucose oxidase-producing strains of the genera selected from the group consisting of Aspergillus and Penicillium in acidic medium having a carbohydrate content within the range of 1 to 3.5% by weight, said carbohydrate having a dextrose equivalent within the range of 60 to 85, and containing a hydrated magnesium sulfate in an amount within the range of 0.003 to 0.01% by weight, monopotassium phosphate in an amount within the range of 0.003 to 0.01% by weight and a source of assimilable nitrogen selected from the group consisting of nitrate salts and ammonium salts.

2. A method as defined in claim 1 wherein the carbohydrate has a dextrose equivalent of 65 to 80.

3. A method as defined in claim 1 wherein the carbohydrate content of the medium is within the range of 1.5 to 2.5% by weight.

4. A method as defined in claim 1 wherein the carbohydrate is a starch hydrolysis product.

5. A method as defined in claim 1 wherein the medium contains corn steep water.

6. A method as defined in claim 5 wherein the corn steep water concentration is within the range of 0.1 to 0.4% by weight.

7. A method as defined in claim 1 wherein the concentration of each of the magnesium sulfate and monopotassium phosphate is about 0.006% by weight.

8. A method as defined in claim 1 wherein the source of assimilable nitrogen content of the medium is within the range of 0.1 to 0.3% by weight.

9. A method as defined in claim 1 wherein the source of assimilable nitrogen is selected from the group consisting of sodium nitrate, potassium nitrate, ammonium sulfate and ammonium nitrate.

10. A method as defined in claim 1 wherein the source of assimilable nitrogen is ammonium nitrate and is present in an amount of about 0.2% by weight.

11. A method as defined in claim 1 wherein the pH of the medium is maintained within the range of 4 to 6.

12. A method as defined in claim 1 wherein the pH of the medium is regulated by the addition of an alkaline material thereto.

13. A method as defined in claim 12 wherein fermentation is carried out until consumption of the alkaline material ceases.

14. A method as defined in claim 1 wherein the process is carried out for a period from 9 to 12 hours.

15. A method as defined in claim 1 wherein the medium also contains a member of the Krebs citric acid cycle.

16. A method as defined in claim 15 wherein the member is selected from the group consisting of the Krebs citric acid cycle acids and their sodium, potassium and ammonium salts.

17. A method as defined in claim 15 wherein the member is present in an amount up to about 0.05% by weight.

18. A method as defined in claim 15 wherein the member is citric acid in a concentration of about 0.02% by weight.

19. A method as defined in claim 1 wherein the pH of the medium is maintained within the range of 4.4 to 4.6.

References Cited

UNITED STATES PATENTS 3,576,718  4/1971  Ziffer _____ 195—36 R

OTHER REFERENCES

Methods in Enzymology, vol. I, pp. 340–345 (1955).

LIONEL M. SHAPIRO, Primary Examiner

UNITED STATES PATENT OFFICE

CERTIFICATE OF CORRECTION

Patent No. 3,701,715　　　　　　　　　　Dated October 31, 1972

Krishnaiyer Lakshminarayanan

It is certified that error appears in the above identified patent and that said Letters Patent are hereby corrected as shown below:

Column 6, line 17, delete "KRRL" and insert therefor -- NRRL -- .

Signed and sealed this 24th day of April 1973.

(SEAL)
Attest:

EDWARD M. FLETCHER, JR.　　　　ROBERT GOTTSCHALK
Attesting Officer　　　　　　　　Commissioner of Patents